United States Patent

Balinth et al.

[15] 3,635,755
[45] Jan. 18, 1972

[54] PRESSURE-SENSITIVE ADHESIVE POLYOLEFIN COMPOUNDS

[72] Inventors: Ivan J. Balinth, Cranford; Charles H. Beede, East Brunswick, both of N.J.

[73] Assignee: Johnson & Johnson

[22] Filed: Feb. 10, 1969

[21] Appl. No.: 798,152

Related U.S. Application Data

[63] Continuation-in-part of Ser. No. 483,344, Aug. 27, 1965, abandoned.

[52] U.S. Cl..................117/122 P, 117/122 PA, 117/122 PF, 117/161 UH, 128/156, 161/247, 260/94.9 E, 260/88.2 R, 260/878 R
[51] Int. Cl...........................................................C09j 7/02
[58] Field of Search....................117/122 P, 122 PA, 122 PF, 117/161 UH; 260/94.9 E, 88.2, 878; 128/156; 161/247

[56] References Cited

UNITED STATES PATENTS

| | | | |
|---|---|---|---|
| 2,285,570 | 6/1942 | Cummins et al. | 117/122 X |
| 2,940,960 | 6/1960 | Tegge et al. | 117/122 X |
| 2,954,367 | 9/1960 | Vandenberg | 260/88.1 |
| 3,445,263 | 5/1969 | Alexander | 117/122 X |

*Primary Examiner*—William D. Martin
*Assistant Examiner*—B. D. Pianalto
*Attorney*—Harold L. Warner, Michael Q. Tatlow and Robert L. Minier

[57] ABSTRACT

Pressure-sensitive adhesive sheets including adhesive tapes, adhesive drapes, adhesive bandages and the like are prepared by coating onto a flexible backing a polyolefin polymer having an intrinsic viscosity of 2.0 to 5.0, a molecular structure in which 40 to 75 percent is isotactic with the remainder containing no more than 20 percent atactic or random and a Williams' plasticity after aging on the backing of 1.5 to 3.

The polyolefin polymer is prepared by polymerizing olefin monomers of two to 16 carbon chain length in the presence of a Ziegler-Natta type catalyst formed through the reaction of a transition element compound containing metal of Group IV through VI of the Mendeleff Periodic Table with an organometallic compound of a metal of Group I through III. Some of both compounds are present at the initiation of the polymerization reaction with further transition element compound being periodically added during polymerization. In an example given titanium tetrachloride is used as the transition element compound and triisobutylaluminum used as the organometallic compound in preparing the catalyst. The olefinic polymer may be a homopolymer in which instance it would be prepared from olefin monomer of six to 11 carbons and could be represented by the general formula:

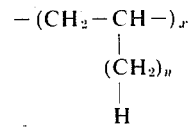

when $n$ is an integer of 3 to 8 and $x$ represents a repetition of the group to a molecular weight sufficiently high to give a polymer within the intrinsic viscosity range indicated or the polymer may be an interpolymer formed through the interpolymerization of two or more olefin monomers of carbon chain length of two to sixteen carbons. In such case a representative formula may be shown as follows:

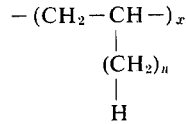

in which $n$ has a numerical value of 3 to 14. The designation $x$ represents interpolymerization with sufficient unit buildup to a polymer of molecular weight sufficiently high to give an interpolymer with an intrinsic viscosity within the range indicated. Thus, for example, where ethylene is used as one of the monomers it would be used with other olefin monomer or monomers of sufficiently long side chain to give in the monomer mix a value to "$n$" of at least 3.

10 Claims, No Drawings

PRESSURE-SENSITIVE ADHESIVE POLYOLEFIN COMPOUNDS

This is a continuation-in-part of application, Ser. No. 483,344 filed Aug. 27, 1965 and now abandoned.

The present invention relates to pressure-sensitive adhesive masses and to pressure-sensitive adhesive masses which are particularly suitable for use in surgical tapes and other pressure-sensitive adhesive coated devices adapted to be adhered to the skin.

The conventional manner of making pressure-sensitive adhesives for surgical use has for many years been to compound the same from synthetic and natural rubbers. It has been necessary to blend the rubber with tackifiers, plasticizers, antioxidants and various other materials in formulating to obtain a satisfactory adhesive product. One of the difficulties with pressure-sensitive adhesive masses of this type, besides the cost of labor and equipment in compounding the same, is the number of separate components which must be included in order to obtain a usable adhesive. The skin sensitivity of individuals differs substantially from one to the other; some people are sensitive to some ingredients which are relatively nonirritating to others. As a result, the greater the number of different components present in the adhesive, the greater chance of skin sensitivity of the part of some individual using the same. Although a great deal of work has been done on trying to make nonallergenic pressure-sensitive adhesive masses, it has been practically impossible to formulate the same from compounded pressure-sensitive adhesives of the rubber-base type.

A pressure-sensitive adhesive must have certain characteristics to be useful. It must be sufficiently tacky, i.e., have sufficient grab or quick-stick to wet and adhere quickly to the surface for which it is designed to adhere. It must also continue to adhere to that surface over extended periods of time. The adhesive must also have sufficient internal strength to prevent its splitting and leaving particles of adhesive on a surface to which an article coated with the adhesive has been adhered when the article is removed. Where the pressure-sensitive adhesive is designed for application to the skin, the problems of adherence are substantially increased. Although the initial tack or stick may be good, adherence over an extended period of time for many pressure-sensitive adhesives is found to be relatively poor whether because of movement of the underlying skin or the nature of the underlying skin surface as where perspiration and other surface changes may occur. The problem is further complicated by the fact that any pressure-sensitive adhesive designed for application to the skin must release from the skin sufficiently readily to permit removal without skin damage. Where the adhesive is too strongly adhered to the skin and has substantial internal strength, small particles of the upper layer of skin are removed with the adhesive with resulting irritation. As a result, although many pressure-sensitive adhesives are available for various commercial uses, relatively few have been found which are suitable for skin application.

We have now discovered that excellent pressure-sensitive adhesives can be prepared from polyolefins, many of which are particularly useful for adhering objects to the skin for extended periods of time, such as 24 hours or greater, if the polyolefins are of the particular type hereinafter more fully described.

These polyolefins can be used as single component pressure-sensitive adhesive masses or mixed with other pressure-sensitive masses if desired. Also, the polyolefin masses of the present invention appear to show substantially no irritation to skin where tested to date. Where single component adhesives are prepared from these polyolefins, the same can be considered as substantially nonallergenic because of the absence of the numerous other ingredients heretofore found necessary to include in preparing conventional rubber-based pressure-sensitive adhesives.

Polyolefin polymers have heretofore been used for making waxes, films, filaments, release agents, high temperature lubricants, and rubberlike materials. For example, high molecular weight polymers of ethylene and propylene have been used for making films, filaments and the like, and lower molecular weight polymers of these olefins have been used as plasticizers and waxes. Also, high molecular weight polybutylene and high molecular weight polyisobutylene have been used as synthetic rubbers, and such synthetic elastomers have been compounded with other ingredients such as tackifiers, plasticizers, antioxidants and the like in formulating pressure-sensitive adhesive compositions in the same manner as adhesives are prepared from natural rubber. Also, lower molecular weight polymers of these olefins have been used as plasticizers and tackifiers. However, none of these polymeric olefinic materials have heretofore been satisfactory for use as pressure-sensitive surgical adhesives except for those of the synthetic rubber type which, as previously indicated, require compounding in the manner required by natural rubbers. However, these synthetic rubberlike polyisobutylene and polybutene polymers are not in and of themselves pressure-sensitive adhesives and are completely unsatisfactory as pressure-sensitive adhesives unless compounded with tackifiers and the like as in the preparation of rubber-base adhesives. Polyisobutylene and polybutene when polymerized to lower molecular weights give sticky products. These products, however, have very low internal strength and are completely unsuitable for use as pressure-sensitive adhesives.

British Pat. Nos. 873,064 and 990,789 disclose polyolefin products formed of medium carbon chain monomers. Of these, British Pat. No. 873,064 discloses liquid high temperature lubricants formed from the polymerization of olefin monomers of $C_6$ to $C_{18}$ carbons. British Pat. No. 990,789 describes release agents for pressure-sensitive adhesives formed by the polymerization of olefin monomers of $C_{12}$ to $C_{24}$ carbons using Ziegler type catalysts.

We have now discovered that if olefins having a carbon chain of about two to 16 carbon atoms are polymerized in such manner as (1) to give polyolefin polymers in which the molecular structure is 40 to 75 percent by weight isotactic with the remainder containing no more than about 20 percent atactic or random; (2) a polymerized monomer content such as represented by the general formula:

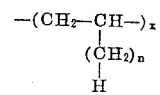

where $n$ is a number of 4 through 9 where all of the units are substantially the same as, for example, with a homopolymer and where $n$ has an average numerical value of about 3 through 14 where the polymer is an interpolymer formed of dissimilar monomers; (3) a Williams' plasticity of about 0.80 to 4.0 (where measured by standard Williams' Plastometer methods); and (4) an intrinsic viscosity (in cyclohexane, at 30° C.) of about 1.5 to 7.0, that the same may be used as the adhesive component in the preparation of pressure-sensitive adhesive coated products, the polyolefins having excellent quick-stick when spread onto flexible or other backings. In the general structure formula given, $x$ represents interpolymerization with sufficient unit buildup to a polymer of molecular weight equivalent to the intrinsic viscosity indicated. An intrinsic viscosity range of about 1.5 to 7.0 is equivalent to a weight average molecular weight range of about 450,000 to 3,500,000 or an $x$ value of about 2,000 to 70,000 depending on the monomers used. The value of $n$ can vary with any particular polymer chain. The general formula, given as illustration, is so designed as to indicate that where the polymer is an interpolymer of dissimilar monomers ethylene may be one of the monomers used. Where ethylene is used as one of the monomers, it would be used with other monomers of sufficiently long side chains to give in the monomer mix an average value to $n$ of at least 3.

Normally, ethylene, where used as a comonomer, would not be used in amounts of more than about 50 mole percent of the total monomer mix and, as indicated by the lower value of $n$, could not be used with butene, for example, as the only other monomer.

The polyolefin adhesives are substantially improved, however, where the polymer contains no more than about 25 percent by weight of polymer which is soluble after having been heated at reflux for at least 2 hours in a solvent composed of equal volumes of heptane and acetone and cooled for at least 16 hours afterwards. This soluble polymer is hereinafter referred to as "U.F." The initials "U.F." indicating "Undesirable Fraction." Where too much U.F. is present, the mass transfer may be undesirable. This is well illustrated in the following table I where the mass transfer is given for polyolefin polymers of the above type illustrating the change in mass transfer characteristics to underlying human skin with increasing U.F., i.e., soluble polymer content.

TABLE I

| % By Weight Soluble Polymer Content—"U.F." | Williams Plasticity | Mass Transfer |
| --- | --- | --- |
|    | 2.21 | None |
| 5  | 1.98 | Essentially none |
| 10 | 1.85 | Essentially none |
| 20 | 1.67 | Very little |
| 30 | 1.46 | A little |
| 40 | 1.26 | To some degree |
| 50 | 1.16 | Considerable |
| 60 | 0.89 | Excessive |

The length of the side chain in the olefin polymer has a substantial effect on its physical and adhesive characteristics. Only with side chains of intermediate length, as indicated by the numerical limits given for $n$, is an amorphous adhesive mass obtained. Where the average value of $n$ is above the upper limits given, the resulting polymer has a tendency to have a crystalline, waxy structure and is generally unsatisfactory for use as a pressure-sensitive adhesive. Also, where the average value of $n$ is less than the lower limit 3, the polyolefin product has a hard nontacky crystalline consistency and is likewise unsuitable for use as a pressure-sensitive adhesive. Also, where pressure-sensitive adhesive qualities are to be maintained without any appreciable change in "quick stik" it has been observed that both the first order transition temperature and the second order transition temperature should be below about 35° C. as determined by differential thermal analysis.

In the preparation of pressure-sensitive adhesive sheet materials for application to the skin such as surgical drapes, pressure-sensitive adhesive tapes, adhesive bandages, and the like in which a flexible backing such, for example, as a nontacky polymer film, paper, fabric, or similar flexible sheet material is coated with the pressure-sensitive adhesive, the polyolefin polymer used should have an intrinsic viscosity within the range of about 2.0 to 5.0 and a U.F. of no more than 25 percent and preferably of no more than 10 percent by weight of the polymer. The intrinsic viscosity [$\eta$] is proportioned to the average molecular weight of the polymer as indicated by the formulae [$\eta$]=$5.75 \times 10^5 \bar{M}_w$ 0.78 (I. E. Ballard, "Dilute Solution Properties of Polyoctene-1," Ph.D. Thesis, Michigan State University, 1963), and the percent "U.F." indicates the amount of low molecular weight material present.

In adhesives for surgical application, i.e., use on the skin, at least 50 mol percent of the monomer mix used in forming the polymer should be alpha olefin monomers of $C_6$ to $C_{12}$ carbon with the remaining monomer content being olefinic monomer or monomers of the group having two to 16 carbons.

The particular polyolefin pressure-sensitive adhesive products of the present invention can be prepared by a single step process utilizing Ziegler-Natta catalyst systems such, for example, as described in British Pat. Nos. 975,675 and 979,123. In accordance with this process, the polymerization is preferably carried out in a saturated hydrocarbon solvent such, for example, as heptane, from which the polymer mass can be spread directly on to a backing and the solvent readily removed. Saturated hydrocarbon solvents have the advantage in that the same are substantially less skin irritating than aromatic solvents so that any trace amounts that may be left in the pressure-sensitive adhesive will not cause irritation to later users.

Care must be taken in carrying out the polymerization if suitable polymers are to be obtained without fractionation. In accordance with my one step process, the catalyst is first prepared by mixing in an inert atmosphere such as nitrogen a compound of a transition element or metal of Groups IV to VIa of the Mendeleff Periodic Table and an organometallic compound of Groups I to III of the Mendeleff Periodic Table, in at least 25 ml. of hydrocarbon diluent, in a molar ratio between 1 and 0.20 at −10 to +187° C. (the upper limit is dependent upon the reflux temperature of the solvent) and the aging the same for a period of at least 1 minute, or it may be extended to several hours. The catalyst components are preferably the halides of titanium and the alkyl or alkyl-halide compounds of aluminum. After the aging period, all of the 1-olefin is added, although in the case of a copolymer, the comonomer(s) may be omitted and added later in increments. Additional organometallic compound is added slowly until the final molar amount is equal to 1–10 times the molar amount of the transition element compound. Hydrocarbon diluent is added as needed in order to maintain the viscosity of the reaction mixture in a range where the mixture is easily stirred. The polymerization is run for a period of 8–96 hours, or longer, and is terminated by the addition of 2-propanol, in an amount sufficient to deactivate the catalyst. Surprisingly, the manner of adding the organometallic compound has a substantial effect on the long term skin adhesion characteristics of the final adhesive width, apparently, no effect on the initial skin adherence. Thus, essentially no difference is noted in the skin adhesion over a period of a few hours of adhesive polymers formed by adding all of the organometallic compound at the start of the polymerization reaction and those formed by adding part of the organometallic compound while the reaction is proceeding. However, for extended periods of wear, such as over a period of 24 hours or greater, the skin adherence of the adhesives obtained by initially adding all of the organometallic compound is substantially reduced whereas the skin adherence of the pressure-sensitive adhesives obtained from polymerization in which part of the organometallic compound is added during polymerization shows essentially no change in skin adherence after 24 hours of continuous wear. This is well shown in example I.

The following examples are given for purposes of illustration only. The invention is not limited thereto, the examples serving only to further illustrate the preparation and use of the pressure-sensitive adhesive materials of the present invention.

EXAMPLE I

Pressure-sensitive adhesive "A" is prepared as follows:

Titanium tetrachloride ($TiCl_4$), 6 mmole is mixed with 2 mmole of triisobutylaluminum in 100 ml. of decalin in a 1-liter, multinecked flask and the mixture is heated, under nitrogen, at 180°–185 C. for 40 min. When cool, an additional 12 mmole of triisobutylaluminum is added and 400 ml. of heptane. 1-Octene, (103 g., 933 mmole) is added and the polymerization runs for 24 hours, at which time it is terminated by the addition of 40 ml. of 2-propanol in 385 ml. of heptane. Yield is 71 g. (69 percent Conversion) of polymer having a Williams' plasticity of 2.39, an intrinsic viscosity of 5.15, and contains 20 percent by weight polymer which is soluble in an equivolume mixture of heptane and acetone.

Pressure-sensitive adhesive "B" is prepared as follows:

Titanium tetrachloride, 1 mmole, is mixed with 1 mmole of triisobutylaluminum in 70 ml. of heptane in a 1-liter, multinecked flask, in a nitrogen atmosphere at room temperature. 1-Octene (53 g. 480 mmole) is added 1 hour later. Twenty minutes after the addition of the octene, an additional 4 mmole of triisobutylaluminum in 80 ml. of heptane is added slowly over a 5-hour period. After 2 hours of reaction, 500 ml. of heptane is added during the next 3 hours. The polymerization is stopped after 96 hours by the addition of 25 ml. of 2-propanol. There is obtained 41 g. (77 percent conversion) of polymer having a Williams' plasticity of 1.53, an intrinsic viscosity of 2.85 and containing 14 percent by weight of polymer soluble in an equivolume mixture of heptane and acetone. The polymer from A has good initial adhesion to skin while that from B has good initial and excellent long term adhesion to akin.

Pressure-sensitive adhesive coated sheets were prepared from masses "A" and "B" as follows:

The polymer portion of the polymerization reaction mixture is dissolved in heptane to give a 17 percent solution by weight. This solution is drawn down on carrier paper with a Gardner knife set at 25 mils. A rayon taffeta cloth (180×54) backing is applied and the system dried in a steam heated cabinet for 2 hours. The weight of mass deposited on the backing is about 2.3 oz./yd.$^2$.

The sheets so prepared had excellent tack and adhered readily to the human skin and other objects by applying with light pressure. However, the long term skin adhesion as tested over a 24-hour period was substantially poorer with adhesive mass "A" than that of the adhesive sheets prepared with adhesive mass "B."

EXAMPLE II

Using the polymerization procedure described in the preparation of adhesive mass B of example I, the monomers listed in the following table are polymerized to give the adhesive masses indicated. These polymers have a molecular structure in which 40 to 75 percent is isotactic with the remainder containing less than 20 percent by weight atactic or random as shown by the determination of the stereoregular structure of the polymer by standard solvent extraction techniques. Tapes are then prepared and tested as follows:

A 16 percent solids solution in heptane of the crude or purified polymer is cast onto silicone-coated kraft paper using a Gardner knife set at 28 mils. The solution is allowed to partially dry at room temperature, and then a backing of 180×54 rayon taffeta is applied with moderate pressure. This laminate of facing, mass, and backing is then dried at 75° C. for 2 hours.

The weight of the mass is found to be about 1.8 oz./yd.$^2$. The laminate is cut into 1-×3-inch strips and tested using a panel of 24 subjects.

"Quick-stick" where used in the specification and in the present example, is measured by a thumb test in which the thumb is pressed lightly onto the adhesive surface of a flexible sheet coated with the adhesive being tested. If there is immediate grab, or adherence of the sheet to the thumb, the tape is considered as having good quick-stick.

The long term skin adherence test consists in placing 1-×3-inch tapes, coated with the adhesive being tested, on the upper arm of a number of subjects and leaving the same there for at least a 24-hour period while the subject pursues his normal activities. At the end of the test period the tapes are checked for adherence and rated. Where essentially no separation of tape from the skin, such as lifting of corners or other partial removal has occurred, the long term skin adhesion is rated as excellent.

DETERMINATION OF INTRINSIC VISCOSITY

A sample of the polymer, preferably 0.05-0.10 g., is placed in a 10 ml. volumetric flask and dissolved with cyclohexane. The 10 ml. of solution was poured into an Ostwald viscometer, supplied by E. H. Sargent & Company, having a 0.4 mm. capillary and a flow time of approximately 60 seconds. The flow time was obtained for this solution and a 5 ml. sample was withdrawn and dried in order to determine the exact concentration of the solution. Cyclohexane, 5 ml. was added and the solution thoroughly mixed. The flow time for this solution was determined and a 5 ml. sample taken in order to determine the exact concentration. These steps were repeated as many times as necessary until the flow time was less than 80 seconds or until the flow time had been measured at three concentrations. The intrinsic viscosity was determined by plotting the $\ln \eta$ C vs C.

DETERMINATION OF THE "UNDESIRABLE FRACTION" ("U.F.") CONTENT

Acetone is added to a warm heptane solution of the crude polymer until it is present in an amount equal in volume to that of the heptane. This mixture is heated at reflux for at least 2 hours. The mixture is allowed to stand at room temperature overnight. The precipitated polymer is separated from the supernatent liquid, dried and weighed. The polymer soluble in the equivolume mixture of heptane and acetone is the "U.F." (Undesirable Fraction). Stereochemical Composition is determined by the procedure described for polypropylene by C. A. Russell appearing in Journal of Applied Polymer Science, 4,

EXAMPLE II.—TABLE

| | Polymer | | | | | | | | | | | | | |
|---|---|---|---|---|---|---|---|---|---|---|---|---|---|---|
| | A | B | C | D | E | F | G | H | I | J | K | L | M | N |
| | 1-heptene | 1-heptene | 1-octene | 1-octene | 1-octene | 1-octene | 1-octene | 1-decene | 1-decene | 1-hexene [1] | 1-hexene [2] | 1-hexene [3] | 1-hexene [4] | 1-octene [5] |
| M-moles | 2,030 | 354 | 480 | 1,000 | 500 | 1,500 | 1,440 | 250 | 1,000 | 200 | 250 | 750 | 1,000 | 1,200 |
| Mmoles TiCl$_4$ | 5 | 2 | 1 | 2 | 1 | 3 | 2 | 1 | 2 | 2 | 2 | 2 | 2 | 3 |
| Moles of monomer/mole Ti | 406 | 177 | 480 | 500 | 500 | 500 | 720 | 250 | 500 | 500 | 500 | 500 | 589 | 598 |
| Mmoles AlR$_3$ | 25 | 5 | 5 | 10 | 1.5 | 9 | 10 | 5 | 10 | 10 | 10 | 10 | 9 | 9 |
| Temp. ° C | (6) | (6) | (6) | (6) | (6) | (6) | (6) | (6) | (6) | (6) | (6) | (6) | (6) | (6) |
| Addition of AlR$_3$/min | 330 | 370 | 231 | 530 | | 140 | 380 | 560 | 1,470 | 615 | 260 | 195 | 15 | 15 |
| Polymerization time, hrs | 94 | 46 | 30 | 51.8 | 116 | 97 | 144 | 18 | 93.5 | 143 | 114 | 117.5 | 24 | 24 |
| Percent conversion | 33 | 45 | 51 | 50.5 | 11 | 78 | 69 | 48 | 62 | 63 | 47 | 72 | 47 | 29.3 |
| Plasticity | 1.99 | 1.55 | 1.91 | 1.46 | 1.15 | 1.52 | 1.37 | 1.07 | 1.14 | 0.95 | 1.21 | 1.81 | 2.03 | 2.37 |
| Intrinsic viscosity | 3.18 | 2.80 | 3.57 | 2.63 | 2.15 | 2.74 | 2.88 | 2.41 | 2.33 | 2.20 | 2.08 | 2.75 | 2.45 | 2.03 |
| Percent UF [7] | 18 | 17 | 6 | 21 | 27 | 20 | 19 | 22 | 14 | 25 | 18 | 17 | 16 | 23.5 |
| Plasticity of purified polymer | 2.43 | 1.78 | 2.10 | 1.96 | 1.65 | 1.89 | 1.77 | 1.45 | 1.34 | 1.35 | 1.55 | 2.27 | 2.48 | 3.03 |
| Intrinsic viscosity | 2.25 | 2.18 | 3.68 | 3.48 | 2.90 | 4.01 | 3.10 | 3.26 | 2.68 | 2.27 | 2.65 | 3.25 | 2.84 | 3.00 |
| Quick-stick | Yes | Yes | Yes | Yes | Yes | Yes | Yes | Yes | Yes | Yes | Yes | Yes | Yes | Yes |
| Skin-adhesion | (8) | (9) | (8) | (8) | (9) | (8) | (9) | (9) | (8) | (8) | (8) | (8) | (8) | (10) |

[1] 1-octene, 600, 1 hexadecene, 200.
[2] 1-octene, 750.
[3] 1-octene, 250.
[4] 1-ethene, 760.
[5] 1-propene, 595.
[6] Room temperature (approximately 30° C.).
[7] UF is the percent of the crude polymer soluble in an equivolume mixture of heptane and acetone.
[8] Excellent.
[9] Not determined.
[10] Good.

219 (1960).

EXAMPLE III

Triethylaluminum (20 ml. of a 0.1 molar heptane solution) is added to a stirred solution of VO Cl$_3$, (2 moles, in 50 ml. of heptane) in a 2-liter, multinecked flask, in a nitrogen atmosphere at room temperature. 1-Octene, (1 mole, 112 g.) is added 30 minutes later. After 5 minutes, it becomes necessary to slowly dilute the reaction mixture with heptane to control the viscosity. Thirty-five minutes after the 1-Octene is added, an additional 80 ml. of 0.1 molar triethylaluminum is added over a 3½-hour interval. The total volume of heptane added is 1 liter. The reaction is terminated after 124½ hours by the addition of 25 ml. of isopropanol. There is obtained 22.4 g. of polymer (20 percent) having a Williams' plasticity of 1.87; an intrinsic viscosity of 3.52; and containing 20 percent by weight of polymer soluble in a 50:50 vol. mixture of heptane and acetone.

A 7.5 percent by weight solution of the above polymer in heptane is cast directly onto the primed surface of a polyvinyl chloride film and dried at approximately 75° C. for 2 hours. A facing of silicone-coated kraft paper is applied and the laminate cut into 1-×3-inch strips and tested as in examples I and II for quick-stick and long term skin adhesion. Both the quick-stick and long term skin adhesion are excellent.

The term polymer as used in the present invention is intended to include both homopolymers and interpolymers. Also adhesive sheet includes adhesive tapes, adhesive coated surgical drapes, and other specific forms of adhesive sheets whether they be large or small.

Particular embodiments of the invention have been used to illustrate the same. The invention, however, is not limited to these specific embodiments. In view of the foregoing disclosure, variations and modifications thereof will be apparent, and it is intended to include within the invention all such variations and modifications except as do not come within the scope of the appended claims.

Having thus described our invention, we claim:

1. A pressure-sensitive adhesive product comprising a backing having a pressure-sensitive adhesive polyolefin polymer coated thereon, said pressure-sensitive adhesive polyolefin polymer having a molecular structure such that 40 to 75 percent by weight of said polyolefin polymer is isotactic with less than 20 percent by weight thereof being atactic said polymer having an intrinsic viscosity of 1.5 to 7.0, a Williams' plasticity of 0.8 to 4.0, and having not more than 25 percent by weight soluble in an equivolume mixture of heptane and acetone and said polymer having a polymerized monomer content such that it can be represented by the general formula:

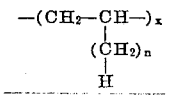

where $n$ has a value of 4 through 9 where all of the units are substantially the same and where $n$ has an average numerical value of about 3 through 14 where the polymer is an interpolymer formed of dissimilar monomers and X represents sufficient polymerization to give an intrinsic viscosity within the range of 1.5 to 7.

2. A pressure-sensitive adhesive product of claim 1 in which said backing is formed of flexible sheet material and in which said polymer has an intrinsic viscosity of 2.0 to 5.0, and having not more than 10 percent by weight soluble in an equivolume mixture of heptane and acetone.

3. A pressure-sensitive adhesive product of claim 2 in which said polymer structure is 70 to 75 percent by weight isotactic with the remainder being substantially syndiotactic or stereo block.

4. An article adapted to be adhered to the human skin having a pressure-sensitive adhesive polyolefin polymer coated on at least a portion thereof, said polymer having a molecular structure such that 40 to 75 percent by weight of said polyolefin polymer is isotactic with less than 20 percent by weight being atactic said polymer having an intrinsic viscosity of 2.0 to 5.0, a Williams' plasticity of 1.5 to 3, and having no more than 25 percent by weight soluble in an equivolume mixture of heptane and acetone and said polymer having a polymerized monomer content such that it can be represented by the general formula:

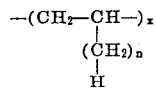

where $n$ has a value of 4 through 9 where all of the units are substantially the same and where $n$ has an average numerical value of about 3 through 14 where the polymer is an interpolymer formed of dissimilar monomers and X represents sufficient polymerization to give an intrinsic viscosity within the range of 1.5 to 7.

5. An article of claim 4 in which said article is a flexible pressure-sensitive adhesive sheet comprising a flexible backing having said pressure-sensitive adhesive polymer coated on at least one side thereof.

6. A pressure-sensitive adhesive sheet of claim 5 in which there is no aromatic solvent.

7. A pressure-sensitive adhesive sheet of claim 5 in which said flexible backing is a woven fabric backing.

8. A pressure-sensitive adhesive sheet of claim 6 in which said woven backing is a woven rayon fabric.

9. A pressure-sensitive adhesive sheet of claim 6 in which said backing is a flexible polymer film.

10. An article of claim 7 in which said polyolefin polymer has a molecular structure such that the isotactic portion of said polymer is 70–75 percent of its weight with remainder being substantially syndiotactic or stereo block.

* * * * *